Jan. 24, 1961 L. D. BARRY 2,969,119
IMPLEMENT POSITIONING DEVICE
Filed Sept. 22, 1954
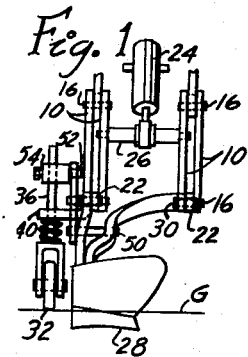
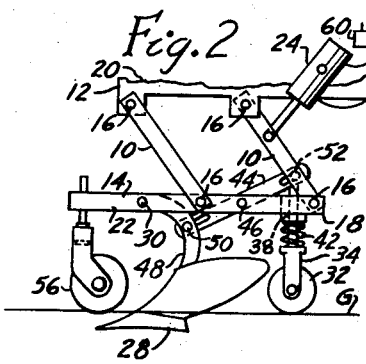
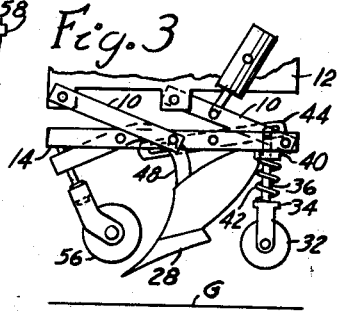
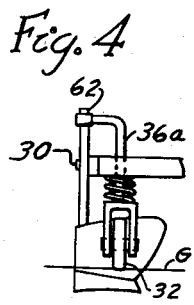
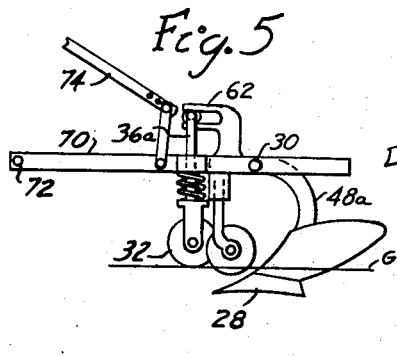
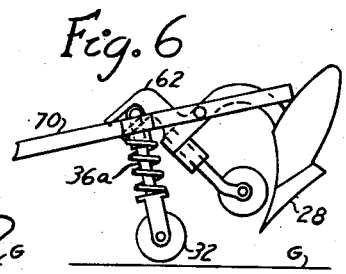
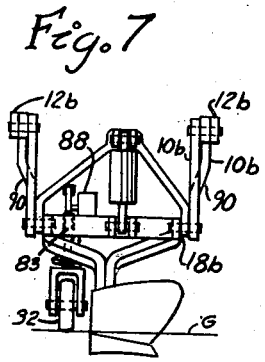
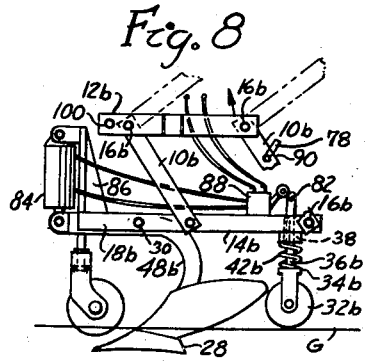
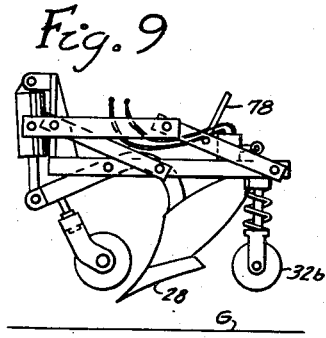
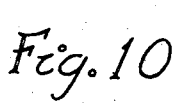
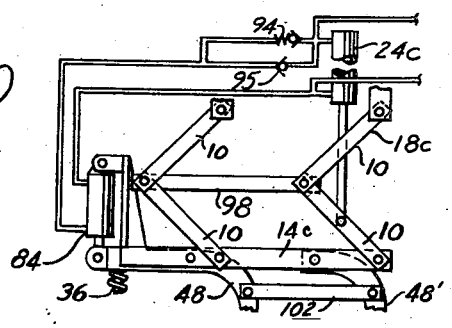
INVENTOR.
Leonard D. Barry United States Patent Office 2,969,119
Patented Jan. 24, 1961

2,969,119

IMPLEMENT POSITIONING DEVICE

Leonard D. Barry, 19300 Pennington Drive,
Detroit 21, Mich.

Filed Sept. 22, 1954, Ser. No. 457,750

11 Claims. (Cl. 172—2)

This invention relates to devices for lifting, lowering, and positioning implements such as plows, cultivators and the like.

This invention provides an arrangement first to swing the implement into working position in the ground with a forward stroke of comparatively short radius, second to allow the supporting vehicle relative vertical movement with respect to the implement and yet maintain the implement parallel with the ground while it is drawn across the land, and third to lift the implement from the ground with a rearward and upward stroke.

It is an object of this invention to enable the plow bottom to be inserted and withdrawn from the ground within a minimum distance of travel and with low power requirements.

A further object of this invention is to provide a parallelogram implement lift as disclosed in my pending patent application Ser. No. 373,176, filed August 10, 1953, now abandoned, on Automatic Farming System of which this relates in part together with means for pivotally swinging the implement into and out of the soil when the parallelogram lift engages the implement with the ground or lifts it out respectively.

By rotatably swinging the plow bottom, harrow, or the like into the ground on a short radius the implement is brought into working position within less distance of travel than when it digs in with its bottom maintained parallel with the ground or when swung on a long radius. It is desired that this swinging motion occur only when the implement is raised or lowered from the ground including when it meets an obstruction, so that the implements are drawn straight in the ground with the least drag. The parallelogram implement lift holds the implement in ground working position to a depth determined by a gage wheel and enables relative vertical movement between the supporting vehicle or tractor and the implement without causing the implement or plow point to change its direction of movement.

Means are arranged to control the vertical swing of the implement and to maintain the proper vertical tilt of the implement. In the preferred forms the gage wheel controls this swinging motion of the implement whereby it is raised from or lowered in the ground by means of lever linkage or hydraulic or air arrangements.

In the long spans between supporting trucks or wheels in bridge type tillers, as disclosed in the application above referred to, the ground elevation at the implement can vary considerably as the implement transverses the bridge, the parallelogram arrangement compensating for this variation yet properly holding the implement.

These and other objects should become apparent from this disclosure.

A few of the many possible embodiments of my invention are illustrated in the accompanying drawing in which:

Figures 1, 4, and 7 are front elevations of variously actuated implement positioners with plow in plowing position.

Figures 2, 5, and 8 are side elevations of the implement positioners shown in respectively Figures 1, 4, and 7.

Figures 3, 6, and 9 are side elevations of the implement positioners, shown in respectively Figures 1, 4, and 7, in raised position.

Figure 10 is a partial side elevation of still another variation.

Referring to the drawing and in particular to Figures 1, 2, and 3, four parallel pivot bars or arms 10 pivotally connect tractor mount or frame 12 with implement frame 14. Bars 10 are pivoted to frame 12 in one plane and are pivoted to frame 14 in a parallel plane by pivot joints 16, thus providing what I term a parallelogram implement lift 18. Frame 12 is secured to the implement carrier or tractor 20 preferably but not necessarily in the horizontal position shown.

The particular arrangement shown is well adapted for application on the implement cars disclosed in my pending application above mentioned. The preferred arrangement therefore is that frames 12 and 14 be of equal length, frame 12 being the frame of the implement car. Then when the parallelogram is fully collapsed (implement raised) the frames 12 and 14 are coextensive together as indicated in Figure 3 showing arms 10 vertical and frames 12 and 14 vertically aligned. Frame 14 is composed of two parallel bars 22 connected together by a second implement lift 48 pivotally secured on pivots 30 to each bar 22. Arms 10 are shown mounted to opposite sides of bars 22 to enable the two bars 10 on each side to clear each other if the lift 18 is lifted to frame 20.

Suitable means such as lift cylinder or ram 24 is arranged to raise and lower the implement frame 14 relative to the mounting frame 12. Cylinder 24 is preferably double acting to force the implement into the soil as well as to raise it and is pivotally mounted head end to the implement carrier or to frame 12, and pivotally mounted rod end to shaft 26 connected between bars 10.

The implement or moldboard plow bottom 28 is mounted on pivots 30 between bars 22 so as to revolve in a vertical arc of less than 90 degrees. Pivots 30 are preferably located directly above the forward portion of the plow share. The movement of the implement in this arc is controlled by gage or land wheel 32, which rides the unplowed ground G in back of the plow and to the land side thereof there being no dead furrows in the Automatic Farming System. Wheel 32 is mounted between the legs of a forked bracket 34 to which vertical shaft 36 is secured. Shaft 36 is vertically slidable in a hole 38 in bracket 40. Spring 42 about shaft 36 between bracket 40 and bracket 34 forces gage wheel 32 downward. Spring 42 is fully compressed or compressed to a limit of travel of shaft 36 at the desired depth of plowing. Bracket 40 could be adjusted by mounting to frame 14 as by slotted holes and bolts (not shown) to provide vertical adjustment for wheel 32. Shaft 36 is linked by lever 44 to plow 28 to raise the plow when frame 14 is lifted from the ground working position. Lever 44 is pivotally secured by shaft 46 to frame 14. One end of lever 44 is connected to implement beams 48 by pin and slot arrangement 50. Rod 52 engages a slot in the opposite end of lever 44. Shaft 36 is adjustably secured in a set screw collar 54 welded to rod 52 whereby vertical adjustment of shaft 36 can be made and the plow bottom aligned horizontally when shaft 36 is at the upper limit of travel. Collar 54 and rod 52 hold wheel 32 aligned. Rolling colter 56 is shown in place secured to an implement beam 48 in the usual manner.

With plow 28 raised, Figure 3, spring 42 extends gage wheel 32 groundward, but since frame 14 is then raised gage wheel 32 is off the ground and spring 42 tilts the plow forward. When the head end of cylinder 24 is opened to pressure and the rod end open to exhaust through a restricting orifice 58, cylinder 24 lowers frame 14 as arms 10 maintain the frame horizontal. Wheel 32 engages the ground as the point of the plowshare hits the ground. Continued lowering of frame 14 compresses spring 42 as the gage wheel through lever 44 turns plow 28 forward into the ground on pivot 30. When spring 42 is fully compressed plow 28 being properly adjusted has its bottom horizontal when the supporting vehicle is on level land. Cylinder 24 holds the plow in working position in the ground to a depth determined by the gage wheel. The reverse process takes place when the pressure in cylinder 24 is reversed forcing the plow backward out of the ground. A large rock or other obstacle engaged by the plow will force the plow backward relative to the vehicle and up out of the ground, cylinder 24 exhausting excessive pressure through relief valve 60. When the obstacle is cleared the plow is automatically reinserted in the soil. The relief valve 60 is preferably adjusted for various soil conditions.

A variation is shown in Figures 4, 5, and 6 in which gage wheel 32 is mounted ahead of the plow and directly actuates the plow beam 48a. The forward end of beam 48a terminates in fork 62 between the legs of which a bent portion of rod 36a engages to move the implement beam about pivots 30 whenever gage wheel 32 is engaged or disengaged from the ground.

Figures 4, 5, and 6 also illustrate the plow pivoting arrangement and controls mounted on a common type of pivoted implement lift. Implement lift beam 70 is pivotally mounted at 72 to the tractor or frame and is raised by linkage 74 in a usual manner. Implement beam 48a is pivotally secured to beam 70 at 30.

The variation shown in Figures 7, 8, and 9 is generally similar to that of Figures 1, 2, and 3 except that the second implement lift plow beam 48b, is caused to pivot hydraulically on the first implement lift 18b, which is similar to lift 18 shown in Figures 1–3 except that greater vertical movement of the implement relative to the support is provided by pivotally securing arms 10b to the inner faces of frame 12b to enable frame 14b to be swung past the upper pivot points 16 on frame 12b.

Any suitable means may be employed for swinging the arms 10b to the elevated position shown in dotted lines, such as the type of cylinder shown at 24 in Figures 1, 2, and 3. The lifting means, be it a cylinder or other device, can be connected to either of the arms 10b as shown at 78 in a manner similar to that illustrated in Figures 1, 2, and 3.

Gage wheel 32 on forked bracket 34 is supported on shaft 36b whose upper end is rounded off. Shaft 36b is slidable in hole 80 between pin 82 and the compressed position of spring 42b. Shaft 36b is kept from rotation by a key 83 in hole 38 or any suitable means, or a swivel caster support for the gage wheel could be provided.

To the forward end of implement beam 48b is pivoted the rod end of positioning cylinder 84 pivotally supported at the head end by bracket 86 secured to frame 14b. Four-way pressure-exhaust cam valve 88 is mounted on frame 14b and connected to a hydraulic system as shown at 89 in Figure 10 and connected at a—a' in Figure 8 so that when the frame 14b supported on bars 106 similar as in parallelogram lift 18b is lowered and wheel 32 engages the ground the rounded upper end of shaft 36b engages the lever of valve 88 opening the head end of cylinder 84 to exhaust and opening the rod end to pressure. When the frame 14b is raised by lifting device 78, valve 88 is reversed and the implement beam 48b tilted, tilting the implement rear-upward from the ground as it is lifted and pulled backward by the parallelogram lift 18b.

The arms 10b are pivotally secured to the outer sides of frame 14b and to the inner sides of frame 12b and are offset by bends 90 therein so they can be swung above pivots 16b in the supporting frame 12b, as shown by phantom lines, Figure 8. This enables considerable vertical movement relative to the length of arms 10b and relative to the horizontal movement yet utilizes the backward sweep of the parallelogram lift as the implement leaves the ground. By this arrangement the implement can be lifted above the height of growing plants a desirable feature for a bridge type tiller.

Figure 10 illustrates both another hydraulic and another parallelogram lift arrangement. The cylinder 84 could be caused to have pressure reversed thereon when implement lift 18c is lowered or raised by connecting cylinder 24c which actuates the lift in parallel with the proper end of cylinder 84. By adding a spring loaded check valve 94 arranged so that pressure is connected to the rod end of cylinder 84 from the lines only when cylinder 24c builds up to a selected pressure the implement beams 48 are not pivoted until the cylinder 24c is pressured against the ground or when frame 14c is fully lowered. The rod end of cylinder 84 is relieved through check valve 95 in parallel with valve 94. Cylinder 84 swings implement 28 upward as soon as pressure to raise the implement lift is applied. Eight arms 10 are pivotally connected in pairs at their ends, and two pairs on each side are pivotally connected at this joint by bar 98 forming a double-parallelogram lift for added vertical movement and no required horizontal movement.

As another alternative the parallelogram lift could be pivotally mounted to the tractor so that it can be rotated to swing the implement into and out of the soil and held with implement in ground working position during runs of the implement across the field. This is shown by aid of Figure 8, the implement lift being pivoted at 100 to the tractor and arranged to swing as indicated by the arrow. It should be evident the plow will require more horizontal movement to dig in when pivoted about point 100 than when pivoted about point 30.

More than one plow bottom or implement can be secured to the implement lift. If each plow bottom is pivotally mounted separately one behind the other one gage wheel might actuate the several plow bottoms by a linkage bar pivotally connecting their beams. This arrangement is illustrated in Figure 10. The beams of plow bottoms 28c and 28'c are pivoted to frame 14c and pivotally connected by connecting rod 102.

Either the land gage 32 or the implement 28 can engage the ground first, but the implement is not considered to be in ground working position until rotated to this position by the second implement lift 48, 48a, 48b, or 48' as the case may be.

Having thus described a few forms of my implement positioner it should be understood that other arrangements and modifications also come within the spirit and scope of this invention as hereinafter claimed.

I claim:
1. A ground-working-implement positioning device which comprises, a first and a second implement lift, a vehicle supporting said first lift, rotary mounting means securing said second lift to said first lift to enable said second lift to swing in substantially a vertical plane parallel to the direction of intended ground working, to and from working position, an implement on said second lift positioned for swinging downward to ground working position by the operation of said second lift, means for controlling the swinging movement of said second lift relative to said first lift and including pressure sensitive control means responsive to a force against said first lift when the implement is lowered substantially to the ground and connected to actuate said controlling means to lower said second lift to ground working position upon said pressure sensitive means receiving a predetermined force.

2. In a device as claimed in claim 1 said control means comprising a land wheel resiliently secured to said first lift to move up and down relative thereto, said controlling means comprising a fluid pressure circuit including a two-way ram having its rod and cylinder ends connected between said first and second lifts and positioned to rotate and hold rotated said second lift relative to said first lift, and valve means on said first lift actuated by vertical movement of said land wheel relative thereto, said valve being arranged and connected to control pressure to opposite ends of said ram, said wheel controlling said valve to pressure said ram to lower said second lift when said wheel substantially engages the ground.

3. An arrangement for positioning and rotating a plow into ground working position comprising in combination: a ground tilling vehicle, a first implement lift having a vertically floating frame mounted on said vehicle, a second implement lift, a plow supported on said second lift, said second lift being pivotally secured on said first lift to swing said plow in a vertical plane forward to ground working position, pressure exerting means between said vehicle and said first lift for applying a substantially constant pressure between said frame of said first lift and the ground, force transmitting means on said first lift connected to swing said second lift forward and down to ground working position when said first lift is pressured against the ground, and means for actuating said last mentioned means according to the force between said first lift and the ground.

4. In combination, a soil tilling vehicle, a soil tilling implement on the vehicle with the forward end of the implement directed forwardly relative to the direction of travel of the vehicle in working position, means including a vertically moveable first lift member supported on the tilling vehicle, a second lift member pivotally mounted on said first lift member for movement in a generally vertical plane, said implement being carried by the second lift member, means connected with the second lift member which, when actuated, pivots said second lift member in a upward and rearward direction from ground working position, means for actuating said last mentioned means comprising a ground-engaging device mounted on said first lift member for vertical movement relative thereto, said device being biased to ground engaging position, and means operably connected with said ground-engaging device for actuating said second lift member in response to movement of the first lift member in an upward direction.

5. A combination as claimed in claim 4 wherein said last mentioned means is also responsive to actuate said second lift member in response to engagement of said device with the ground to rotate said implement down and forward to ground working position, the device being positioned to control said second lift to rotate before said implement is lowered to ground working position.

6. An implement positioning device for mounting on a tilling vehicle comprising in combination an implement lift having a vertically floating frame, an implement beam pivotally secured to said frame for supporting an implement to swing in a vertical plane through the line of pull of the beam and be limited in its swing from a rearward and up lifted position downward and forward to ground working position of the implement, a land gage wheel, and means securing said gage wheel to said frame to have vertical movement with respect thereto when engaged with the ground; the combination with a fluid pressure circuit including pressurizing means, a double-acting positioning ram and a two-position valve controlling pressure alternately to opposite ports of said ram, the ends of said ram being connected one to said frame and the other to said beam at such a point and having a stroke to pivot said beam into ground working position when pressured, and means connecting said wheel and said valve to move said valve when said wheel engages the ground to pressure said ram in such a direction to lower to ground working position an implement on said beam, said cylinder being substantially at an end of its stroke when said implement is at ground working position to prevent the implement from being tilted forward out of ground working position.

7. In a combination as claimed in claim 6, means biasing said valve to reverse to rotate the implement rearward and up from ground working position when said wheel extends beyond the point at which said cylinder rotates the implement down.

8. An arrangement for swinging a plow into and out of ground working position comprising in combination; an implement lift, a moldboard plow pivotally secured to said lift on a horizontal axis at right angles to the line of working of the plow, a double acting cylinder connected between said lift and the plow for swinging and limiting movement of said plow on the pivot between a rear up position of the plow above ground working position and a substantially horizontal working position, a land gage, a vertically floating support securing said gage to said lift to enable said gage to ride the ground when said lift is lowered, a fluid pressure system including a two position reversing valve connected to pressure alternate ends of said cylinder to operate said cylinder fully to one end or the other of its stroke according to the end pressured, said valve being actuated by said gage to pressure the end of said cylinder as said lift is lowered to swing said plow forward and down into ground working position and to rotate said implement backward from the ground as said lift is raised, said cylinder limiting the forward swinging movement of said plow at substantially a horizontal position of the plow to maintain the plow in ground working position when said cylinder is pressured to swing the implement forward.

9. In a positioning device as claimed in claim 6, said implement lift having a double acting lift ram connected and arranged to hold an implement down in ground working position as well as to lift it up, check valve means, a pressure supply including a pressure-exhaust valve, said positioning ram being pressure connected through said check valve means to said lift ram and said pressure exhaust valve so that the rams lift together and lower first the lift ram and when pressure builds up in that ram it relieves to lower the positioning ram.

10. An implement lift arrangement for rotating one or more plows forward into the ground when lowered thereto and rotating them rearward therefrom when lifted therefrom comprising; an implement lift, at least one beam for supporting a plow pivotally secured to said lift to swing in a vertical plane in the line of plowing and be lifted and lowered thereby to and from the ground, a fluid pressure system including a first piston cylinder connected to lift and lower said lift, a second piston cylinder connected between said lift and said beam to swing the beam forward into working position when the plows engage the ground and backward when said lift is lifted, the lifting ends of both said cylinders being fluid connected, reversed check valves in parallel, the lowering ends of both cylinders being fluid connected through said reversed check valves, the said check valve arranged to pass fluid to the second said cylinder being a spring loaded check valve arranged so that pressure is connected to the rod end of said second cylinder only when said first cylinder builds up to a selected pressure and so that otherwise both cylinders operate in parallel to lift and lower together.

11. An implement positioning device which comprises, a plurality of beams for moldboard plow bottoms, an implement lift frame, said beams being pivotally secured to said frame to swing substantially in a vertical plane through the line of pull of the plow bottom, linkage means connecting said beams together to turn as a group, a depth gage, means mounting said gage to said frame for vertical movement relative to said frame when said gage is forced against the ground, said gage being biased to extend downward and means to limit the extension of said gage, means arranged to raise and lower said implement lift relative to a supporting vehicle, and means controlled by said gage to pivot said beams forward into ground working position as the gage is contracted before said beams reach ground working position.

References Cited in the file of this patent

UNITED STATES PATENTS

| | | |
|---|---|---|
| 2,406,484 | Allen | Aug. 27, 1946 |
| 2,601,464 | Tanke | June 24, 1952 |
| 2,626,551 | Starr | Jan. 27, 1953 |
| 2,667,112 | Carney | Jan. 26, 1954 |
| 2,701,509 | Rolfes | Feb. 8, 1955 |
| 2,704,015 | Wilson | Mar. 15, 1955 |
| 2,755,721 | Rusconi | July 21, 1956 |

FOREIGN PATENTS

| | | |
|---|---|---|
| 473,798 | France | Oct. 15, 1914 |
| 361,986 | Germany | Oct. 25, 1922 |
| 121,426 | Sweden | Apr. 13, 1948 |
| 240,181 | Switzerland | Apr. 1, 1946 |